(12) United States Patent
Tateno (10) Patent No.: US 10,253,656 B2
(45) Date of Patent: *Apr. 9, 2019

(54) RANKINE CYCLE SYSTEM FOR VEHICLE

(71) Applicant: TOYOTA JIDOSHA KABUSHIKI KAISHA, Toyota-shi, Aichi-ken (JP)

(72) Inventor: Manabu Tateno, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,987

(22) Filed: Oct. 27, 2016

(65) Prior Publication Data
US 2017/0175587 A1    Jun. 22, 2017

(30) Foreign Application Priority Data

Dec. 16, 2015  (JP) .................................. 2015-244960

(51) Int. Cl.
*F01K 23/06* (2006.01)
*H02K 7/18* (2006.01)
*F01K 23/10* (2006.01)

(52) U.S. Cl.
CPC ............ *F01K 23/065* (2013.01); *F01K 23/10* (2013.01); *F05D 2220/62* (2013.01);
(Continued)

(58) Field of Classification Search
CPC .... F01K 23/065; F01K 23/10; F05D 2220/62; H02K 7/1823; Y02T 10/166
(Continued)

(56) References Cited

U.S. PATENT DOCUMENTS

| 3,350,876 A | * | 11/1967 | Johnson | .................. F01K 23/14 60/618 |
| 4,300,353 A | * | 11/1981 | Ridgway | ................. F01K 23/14 60/618 |

(Continued)

FOREIGN PATENT DOCUMENTS

CN    102812211 A    12/2012
CN    203547951 U     4/2014
(Continued)

OTHER PUBLICATIONS

United Sates Patent and Trademark Office, Non-Final Office Action dated Mar. 9, 2018 in U.S. Appl. No. 15/337,385, 9 pages.
(Continued)

*Primary Examiner* — Thai Ba Trieu
*Assistant Examiner* — Dapinder Singh
(74) *Attorney, Agent, or Firm* — Hunton Andrews Kurth LLP (57) ABSTRACT

A Rankine cycle system includes a boiler configured to apply waste heat to refrigerant circulating in an internal-combustion engine to vaporize the refrigerant; a gas-liquid separator configured to separate gas-liquid two-phase refrigerant, sent from the boiler, into gas phase fluid and liquid phase fluid; a superheater configured to superheat the gas phase fluid, sent from the gas-liquid separator, through heat exchange with exhaust gas of the internal-combustion engine; an expander configured to expand the gas phase fluid, passing through the superheater, to recover thermal energy, and a condenser configured to condense the gas phase fluid, passing through the expander, to return the gas phase fluid to liquid phase fluid. The gas-liquid separator is fixed to a cylinder head of the internal-combustion engine. It is preferable that the gas-liquid separator is configured to (Continued)

include a bracket, and is fixed to the cylinder head via the bracket.

4 Claims, 11 Drawing Sheets

(52) U.S. Cl.
CPC ............ *H02K 7/1823* (2013.01); *Y02T 10/16* (2013.01); *Y02T 10/166* (2013.01)

(58) Field of Classification Search
USPC .................................................. 60/611, 618
See application file for complete search history.

(56) References Cited

U.S. PATENT DOCUMENTS

| | | |
|---|---|---|
| 4,696,261 A | 9/1987 | Hayashi |
| 2004/0163611 A1* | 8/2004 | Raikio .................... F02B 47/10 123/25 A |
| 2013/0008165 A1 | 1/2013 | Yamada et al. |
| 2014/0250889 A1 | 9/2014 | Mizoguchi et al. |
| 2017/0175588 A1 | 6/2017 | Tateno |

FOREIGN PATENT DOCUMENTS

| | | |
|---|---|---|
| DE | 112010005419 T5 | 1/2013 |
| JP | S57099222 A | 6/1982 |
| JP | S60134818 U | 9/1985 |
| JP | H07259548 A | 10/1995 |
| JP | 2001182504 A | 7/2001 |
| JP | 2002-316530 A | 10/2002 |
| JP | 2003314279 A | 11/2003 |
| JP | 2008286022 A | 11/2008 |
| JP | 2009108794 A | 5/2009 |
| JP | 2011-189824 A | 9/2011 |
| JP | 2012159065 A | 8/2012 |
| JP | 2013-015075 A | 1/2013 |
| JP | 2013076369 A | 4/2013 |
| JP | 2014092042 A | 5/2014 |
| JP | 2015-094271 A | 5/2015 |

OTHER PUBLICATIONS

USPTO, Final Office Action dated Sep. 28, 2018 in U.S. Appl. No. 15/337,385, 10 pages.
United States Patent and Trademark Office, Notice of Allowance dated Dec. 27, 2018 in U.S. Appl. No. 15/337,385, 5 pages.

* cited by examiner

RANKINE CYCLE SYSTEM FOR VEHICLE

CROSS-REFERENCE TO RELATED APPLICATION

The present application claims priority to Japanese Patent Application No. 2015-244960 filed on Dec. 16, 2015, which is incorporated herein by reference in its entirety.

TECHNICAL FIELD

Embodiments of the present invention relate to a Rankine cycle system for vehicle, and in particular, to a structure of mounting a Rankine cycle system on a vehicle.

BACKGROUND

Patent Literature 1 discloses a technology relating to a Rankine cycle system mounted on a vehicle. In this Rankine cycle system, liquid phase fluid is boiled by waste heat of an engine and is changed to gas phase fluid. The gas phase fluid is expanded whereby work is taken out, and then the expanded gas phase fluid is condensed to be returned to liquid phase fluid.

Following is a list of patent literatures which the applicant has noticed as related arts of embodiments the present invention.

Patent Literature 1: JP 2015-94271 A
Patent Literature 2: JP 2002-316530 A
Patent Literature 3: JP 2011-189824 A

SUMMARY

In the case of mounting a Rankine cycle system on a moving body such as a vehicle or the like as in the conventional art described above, the environment surrounding the Rankine cycle system is always changing due to traveling air, a pressure change, or the like. In particular, as a gas-liquid separator which is a constituting element of a Rankine cycle system does not have a heat source, it may be largely affected by a low-temperature environment so that the amount of heat rejection may increase. When the amount of heat rejection increases, the gas phase fluid (vapor) stored inside is condensed. In that case, as the vapor amount sent to an expander decreases, the heat recovery efficiency of the system is lowered. In the conventional art described above, consideration is not given on suppression of a temperature drop of the gas-liquid separator. As such, there is still room for improving the heat recovery efficiency.

The present invention has been made in view of the aforementioned problem. An object of the present invention is to provide a Rankine cycle system for vehicle capable of improving heat recovery efficiency of the Rankine cycle system while suppressing a temperature drop of a gas-liquid separator.

In order to achieve the above described object, a first embodiment of the present invention is a Rankine cycle system for vehicle including a boiler configured to apply waste heat to refrigerant circulating in an internal-combustion engine to vaporize the refrigerant;

a gas-liquid separator configured to separate gas-liquid two-phase refrigerant, sent from the boiler, into gas phase fluid and liquid phase fluid;

a superheater configured to superheat the gas phase fluid, sent from the gas-liquid separator, through heat exchange with exhaust gas of the internal-combustion engine;

an expander configured to expand the gas phase fluid, passing through the superheater, to recover thermal energy, and a condenser configured to condense the gas phase fluid, passing through the expander, to return the gas phase fluid to liquid phase fluid, wherein the gas-liquid separator is fixed to a cylinder head of the internal-combustion engine.

A second embodiment of the present invention is the Rankine cycle system for vehicle according to the first embodiment, wherein the gas-liquid separator includes a bracket made of metal, and the gas-liquid separator is fixed to the cylinder head via the bracket.

A third embodiment of the present invention is the Rankine cycle system for vehicle according to the first embodiment, wherein the condenser is arranged on a vehicle front side with respect to the gas-liquid separator, and the gas-liquid separator is arranged at a position where a part of the gas-liquid separator overlaps the condenser when seen from the front of the vehicle.

A fourth embodiment of the present invention is the Rankine cycle system for vehicle according to the first embodiment, wherein the internal-combustion engine includes a plurality of cylinders arranged in series, and the gas-liquid separator is fixed on an exhaust side with respect to a plane including a central axis of the cylinders, the plane being in parallel with a row direction of the cylinders.

A fifth embodiment of the present invention is the Rankine cycle system for vehicle according to the first embodiment, further including a heat insulation tank that integrally covers the superheater and the gas-liquid separator.

According to the first embodiment of the present invention, as the gas-liquid separator is fixed to the cylinder head, the heat of the cylinder head is transferred to the gas-liquid separator efficiently. As such, according to this embodiment, it is possible to suppress a temperature drop of the gas-liquid separator. Thus, it is possible to suppress lowering of the efficiency of the Rankine cycle.

According to the second embodiment of the present invention, the gas-liquid separator is fixed to the cylinder head via a metal bracket. Thus, according to this embodiment, it is possible to fix the gas-liquid separator to the cylinder head reliably, and to transfer the heat of the cylinder head to the gas-liquid separator efficiently via the bracket.

According to the third embodiment of the present invention, a part of the traveling air flowing toward the gas-liquid separator is blocked by the condenser. Thus, according to this embodiment, as heat rejection from the gas-liquid separator is suppressed, it is possible to suppress lowering of the efficiency of the Rankine cycle.

According to the fourth embodiment of the present invention, as the gas-liquid separator is kept at a high temperature by the exhaust heat of the exhaust side, it is possible to suppress heat rejection from the gas-liquid separator effectively.

According to the fifth embodiment of the present invention, as the temperature around the gas-liquid separator can be maintained by the heat insulation tank, it is possible to suppress heat rejection from the gas-liquid separator effectively.

BRIEF DESCRIPTION OF DRAWINGS

FIG. 14 is a diagram for explaining the shape of a bracket 6a;

DESCRIPTION OF EMBODIMENTS

Hereinafter, embodiments of the present invention will be described with reference to the drawings. In the drawings, common elements are denoted by the same reference numerals and are not repeatedly described herein. It should be noted that in the case of referring to the numbers such as the number, amount, volume, range, and the like of each element in the embodiments provided below, the present invention is not limited to such numbers referred to, unless it is described specifically or apparently specified to such numbers in principle. Further, the structures described in the following embodiments are not indispensable for the present invention unless it is described specifically or apparently specified in principle.

First Embodiment

1. Configuration of Rankine Cycle System

Figure 1:
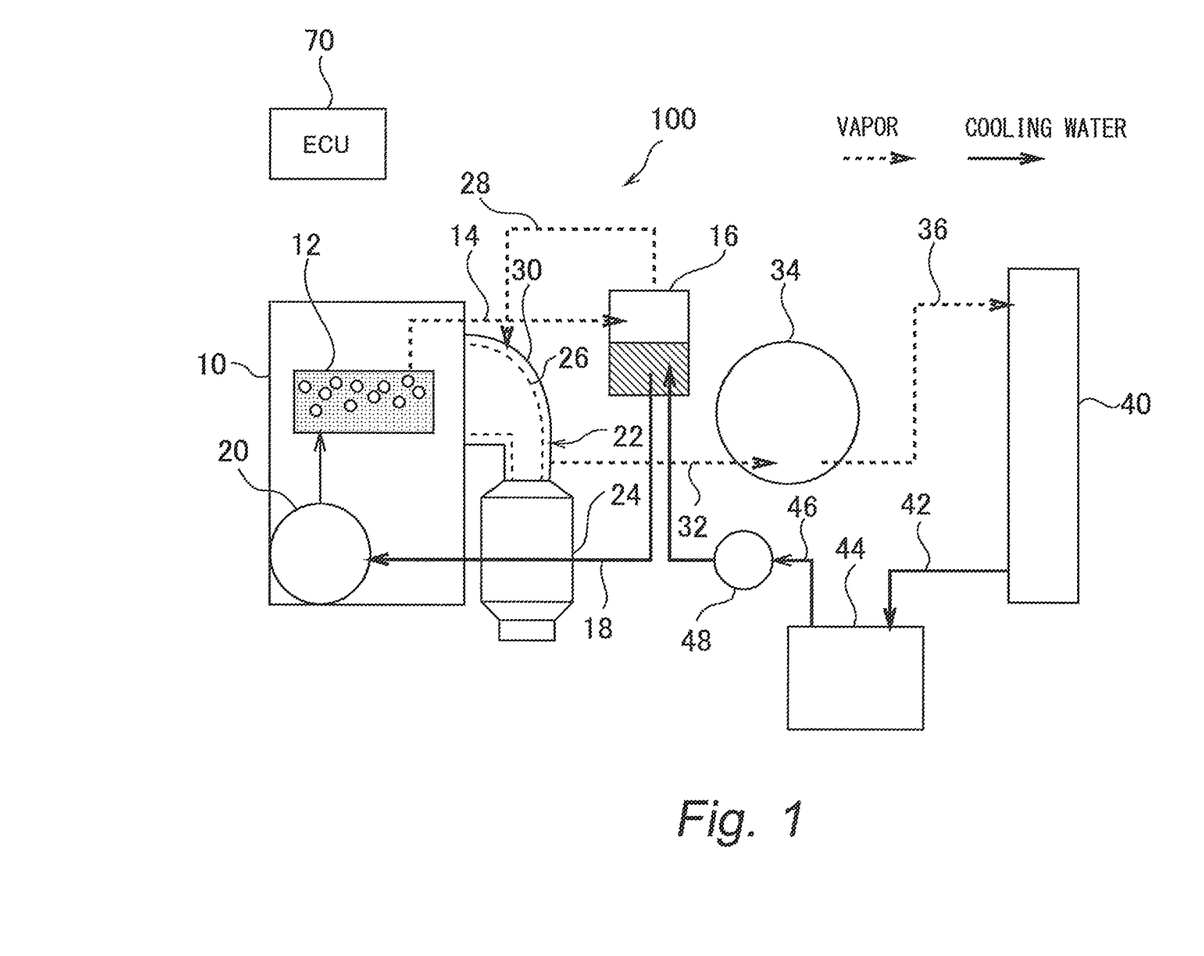
FIG. 1 is a diagram illustrating a configuration of a Rankine cycle system according to a first embodiment of the present invention.

FIG. 1 is a diagram illustrating a configuration of a Rankine cycle system 100 of a first embodiment. The Rankine cycle system 100 of the first embodiment is configured as a Rankine cycle system for vehicle which includes an internal-combustion engine (engine) 10 and is mounted on a vehicle. The type and the structure of the engine 10 are not limited. However, a cylinder block and a cylinder head of the engine 10 are provided with a refrigerant flow path 12 through which refrigerant circulating in the engine 10 flows. The refrigerant flow path 12 includes a water jacket surrounding the cylinder. The engine 10 is cooled through heat exchange with the refrigerant flowing in the refrigerant flow path 12. In the present embodiment, water is used as refrigerant.

The engine 10 is cooled in such a manner that the refrigerant flowing in the refrigerant flow path 12 is boiled by the waste heat of the engine 10 and a part thereof is vaporized. This means that the refrigerant flow path 12 functions as a boiler for boiling the refrigerant in a liquid phase flowing inside by the heat of the engine 10. It should be noted that the configuration of the refrigerant flow path 12 is not limited particularly if it is a path through which the refrigerant is able to flow inside the engine 10. Further, the refrigerant flowing in the refrigerant flow path 12 is not limited to water. Any refrigerant may be used if it is liquid phase fluid at room temperature and is changed to gas phase fluid when boiled by the heat of the engine 10.

The refrigerant flow path 12 of the engine 10 is connected with a gas-liquid separator 16 via a refrigerant pipe 14. When the refrigerant is boiled by the heat of the engine 10, liquid phase fluid is discharged from the refrigerant flow path 12, along with gas phase fluid. The gas-liquid separator 16 separates the gas-liquid two-phase refrigerant, flowing into the gas-liquid separator 16, into liquid phase fluid and gas phase fluid. The gas-liquid separator 16 is connected with a first water pump 20 via a refrigerant pipe 18. The liquid phase fluid, separated by the gas-liquid separator 16, flows into the first water pump 20 via the refrigerant pipe 18, and is sent to the refrigerant flow path 12 by the first water pump 20.

The gas-liquid separator 16 is connected with a superheater 30 via a refrigerant pipe 28. The superheater 30 is provided upstream of the catalyst 24 in an exhaust passage 22 of the engine 10. More specifically, the superheater 30 is provided so as to cover the periphery of an exhaust manifold 26 and is integrated with the exhaust manifold 26. A space surrounded by the inner wall surface of the superheater 30 and the external wall surface of the exhaust manifold 26 forms a flow path in which gas phase fluid sent from the gas-liquid separator 16 flows. As both gas phase fluid and liquid phase fluid exist in the gas-liquid separator 16, the gas-phase fluid is in a state of saturated vapor. The gas phase fluid flowing into the superheater 30 becomes superheated vapor by absorbing exhaust heat transferred from the wall surface of the exhaust manifold 26. It should be noted that the superheater 30 is not necessarily integrated with the exhaust manifold 26. The superheater 30 may be integrated with another part (catalyst 24, for example) of the exhaust passage 22, if the superheater 30 is configured to be able to absorb exhaust heat.

The superheater 30 is connected with a turbine 34 which is an expander, via a refrigerant pipe 32. In the turbine 34, gas phase fluid (superheated vapor) sent from the superheater 30 is expanded, and heat energy is recovered. A connecting portion between the refrigerant pipe 32 and the turbine 34 is provided with a supersonic nozzle not shown. The gas phase fluid is jetted from the supersonic nozzle to the turbine 34 to thereby rotate the turbine 34. Rotation of the turbine 34 is transmitted to an output shaft of the engine 10 via a reduction device not shown. This means that the heat energy recovered by the turbine 34 is used for assisting the engine 10. However, it is also possible to have a configuration in which a power generator is driven by the turbine 34 and the generated electricity is stored in a storage battery.

The gas phase fluid, expanded by the turbine 34, is sent to the condenser 40 via a refrigerant pipe 36. The gas phase fluid, sent to the condenser 40, is cooled and condensed by the condenser 40 to be returned to liquid phase fluid. The liquid phase fluid generated by condensation of the gas phase fluid is sent from the condenser 40 to a catch tank 44 via a refrigerant pipe 42, and is temporarily stored in the catch tank 44. The catch tank 44 is connected with the gas-liquid separator 16 via a refrigerant pipe 46. The refrigerant pipe 46 is provided with a second water pump 48. The second water pump 48 is a pump for sending liquid phase fluid, stored in the catch tank 44, to the gas-liquid separator 16. A check valve, not shown, is provided between the second water pump 48 and the gas-liquid separator 16. The check valve is used for preventing backflow of liquid phase fluid from the gas-liquid separator 16 to the catch tank 44. It should be noted that the refrigerant pipe 46 may be configured to connect the catch tank 44 and an intermediate portion of the refrigerant pipe 18. With such a configuration, when the second water pump 48 is driven, the liquid phase fluid stored in the catch tank 44 is sent to the gas-liquid separator 16 and the engine 10.

The Rankine cycle system 100 further includes an electronic control unit (ECU) 70 as a control device. The ECU 70 includes at least an input/output interface, a memory, and a central processing unit (CPU). The input/output interface is provided to take in sensor signals from various sensors provided to the Rankine cycle system 100 or the engine 10 on which the Rankine cycle system 100 is mounted, and also output operation signals to various actuators provided to the Rankine cycle system 100. The memory stores various control programs, maps, and the like. The CPU reads, from the memory, and executes control programs or the like, and generates operation signals of various actuators based on the sensor signals taken in.

2. Structure of Mounting Rankine Cycle System on Vehicle

The Rankine cycle system 100 is mounted in an engine compartment of a vehicle for accommodating the engine 10. As the mounting space inside the engine compartment is limited, various restrictions may be placed on the arrangement of the respective components of the Rankine cycle system 100. Further, as the gas-liquid separator 16 which is one component of the Rankine cycle system 100 does not have a heat source, it is susceptible to the surrounding temperature. As such, when the gas-liquid separator 16 is arranged in a low temperature region, condensation of the gas phase fluid (vapor) inside thereof progresses by heat rejection from the gas-liquid separator 16. As such, the inventor of the present application has carried out intensive studies on the structure of mounting the gas-liquid separator 16 on a vehicle to suppress lowering of the heat recovery efficiency of the Rankine cycle system 100 caused by heat rejection from the gas-liquid separator 16. As a result, the inventor of the present application has found out a structure of mounting the gas-liquid separator 16 on a vehicle described below.

2-1. Gas-Liquid Separator Fixing Structure

Figure 2A:
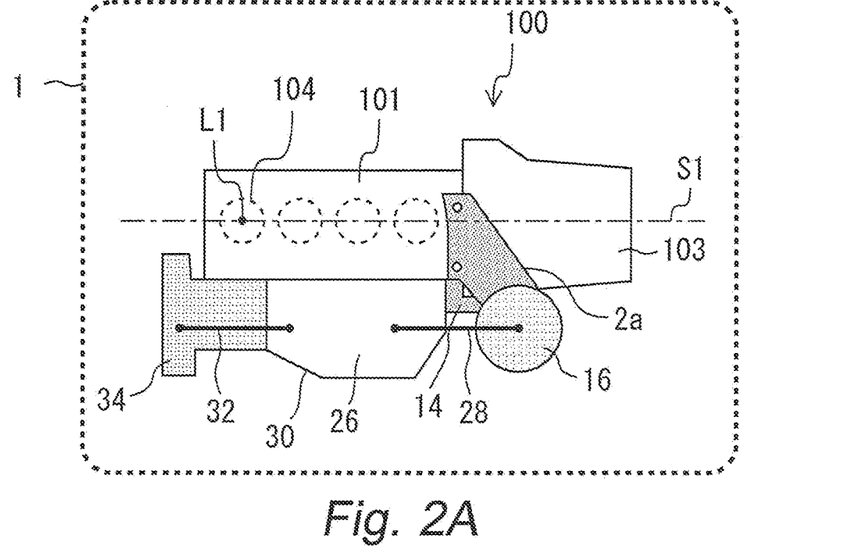
FIGS. 2A and 2B are schematic diagrams for explaining a structure of fixing a gas-liquid separator.
Figure 2B:
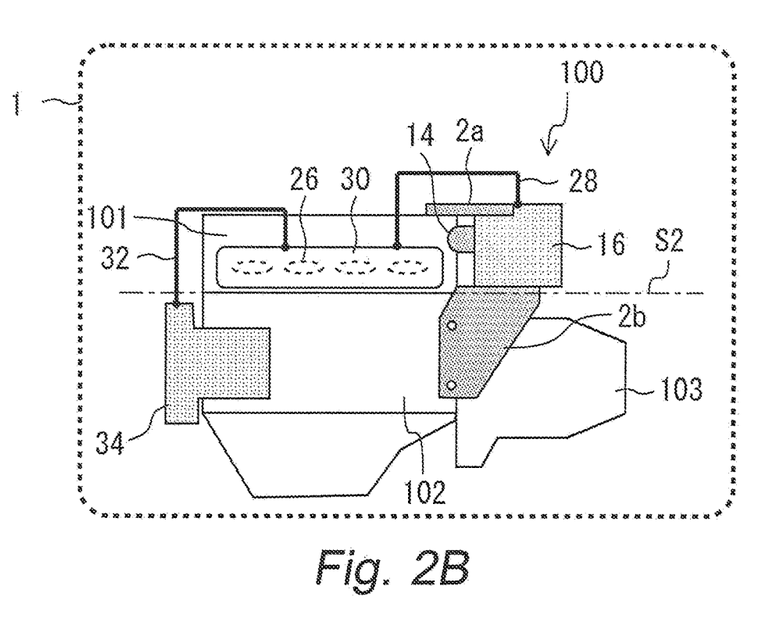

FIGS. 2A and 2B are schematic diagrams for explaining a structure of fixing a gas-liquid separator, in which FIG. 2A illustrates the Rankine cycle system when seen from the top of the vehicle, and FIG. 2B illustrates the Rankine cycle system when seen from the front of the vehicle, respectively. Further, in FIGS. 2A and 2B, configurations of the Rankine cycle system 100 other than the main components thereof are omitted. As illustrated in FIGS. 2A and 2B, the Rankine cycle system 100 is mounted in an engine compartment 1 of a vehicle. The engine 10 is mounted on an engine mount (not shown) provided in the engine compartment 1. The gas-liquid separator 16 is fixed to the engine 10 via brackets 2a and 2b. More specifically, one end of the bracket 2a is fixed to an upper portion of the gas-liquid separator 16, and the other end thereof is fixed to an upper face of a cylinder head 101 of the engine 10. Further, one end of the bracket 2b is fixed to a lower portion of the gas-liquid separator 16, and the other end thereof is fixed to a side face of a cylinder block 102 of the engine 10. It should be noted that each of the brackets 2a and 2b is formed by processing a plate material made of metal, and is in a shape capable of securing strength necessary for fixing the gas-liquid separator 16. Further, a plurality of bolts is used for fixing between the brackets 2a and 2b and the engine 10 and between the brackets 2a and 2b and the gas-liquid separator 16, respectively.

According to the structure of fixing the gas-liquid separator 16, the gas-liquid separator 16 is fixed to the engine 10 via the metal brackets 2a and 2b. Thereby the heat generated in the engine 10 is transferred to the gas-liquid separator 16 via the brackets 2a and 2b. In the gas-liquid separator 16, vapor condensation due to a temperature drop can be suppressed by the heat received from the engine 10. As such, lowering of heat recovery efficiency of the Rankine cycle system 100 can be suppressed.

It should be noted that the brackets are able to efficiently transfer heat near the cylinder 104 having a high temperature to the gas-liquid separator 16, if at least the bracket 2a for fixing the gas-liquid separator 16 to the cylinder head 101 is included. As such, it is only necessary that at least the bracket 2a is included. There is no limitation on the necessity of other brackets including the bracket 2b and the fixing structure thereof. Further, the material of the brackets 2a and 2b is not limited to metal. However, it is preferable to use a material having high heat conductivity and high strength.

2-2. Arrangement of Gas-Liquid Separator

By fixing the gas-liquid separator 16 to the engine 10 via the brackets 2a and 2b as described above, a temperature drop of the gas-liquid separator 16 can be suppressed. It is also possible to further suppress a temperature drop depending on the arrangement of the gas-liquid separator 16. Hereinafter, description will be given on a structure for further improving heat recovery efficiency of the Rankine cycle system 100, while focusing on the positional relations between the gas-liquid separator 16 and other components.

2-2-1. Positional Relation Between Gas-Liquid Separator and Engine

A reference character S1 in FIG. 2A denotes a plane including a central axis L1 of the cylinder 104, and the plane is in parallel with a row direction of the cylinders 104 provided in series along the longitudinal direction of the cylinder block 102. Further, a reference character S2 in FIG. 2B denotes a mating face with the cylinder block 102 of the cylinder head 101. In the below description, an "exhaust side" indicates an exhaust side where the exhaust passage 22 of the engine 10 is provided with respect to the plane S1, and an "air intake side" indicates an air intake side where an air intake passage, not shown, of the engine 10 is provided with respect to the plane S1.

In the fixing structure illustrated in FIGS. 2A and 2B, a transmission 103 is fixed to a side face of the cylinder block 102. The gas-liquid separator 16 is arranged in a space of the exhaust side above the transmission 103 (that is, an exhaust passage 22 side of the engine 10). The region of the exhaust side of the engine 10 is in a higher temperature than that of the air intake side of the engine 10 due to an effect of the exhaust heat. As such, according to the arrangement of the gas-liquid separator 16 illustrated in FIGS. 2A and 2B, the gas-liquid separator 16 can be arranged in a high temperature region in the engine compartment 1. Thus, a temperature drop of the gas-liquid separator 16 can be suppressed effectively.

Further, in the fixing structure illustrated in FIGS. 2A and 2B, the gas-liquid separator 16 is arranged on the cylinder head 101 side of the engine 10 with respect to the plane S2. In the engine compartment 1 of the vehicle, the temperature becomes higher upward. As such, according to the arrangement of the gas-liquid separator 16 illustrated in FIGS. 2A and 2B, the gas-liquid separator 16 can be arranged in a high temperature region in the engine compartment 1. Thus, a temperature drop of the gas-liquid separator 16 is suppressed effectively.

Further, in the fixing structure illustrated in FIGS. 2A and 2B, the gas-liquid separator 16 is arranged near the superheater 30. Thereby, the pipe length of the refrigerant pipe 28 can be shortened. As such, heat rejection from the refrigerant pipe 28 can be suppressed. Thus, heat recovery efficiency of the Rankine cycle system 100 can be further improved.

Figure 3:
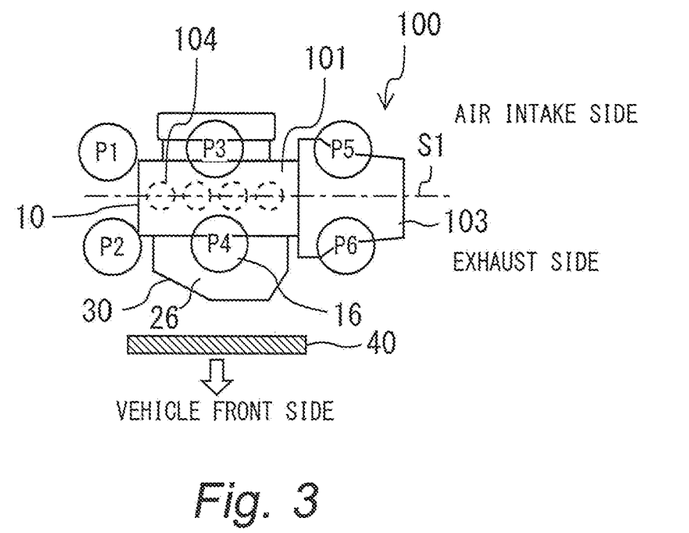
FIG. 3 is a diagram for explaining a best positional relation between a transverse engine and a gas-liquid separator.
Figure 4:
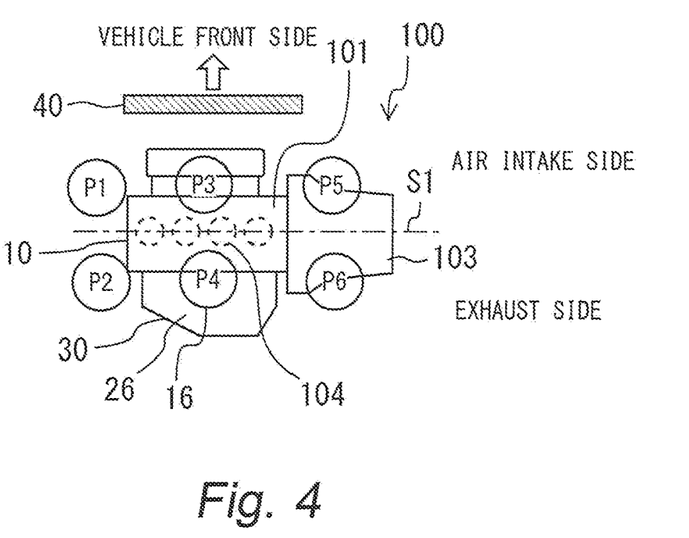
FIG. 4 is a diagram for explaining a best positional relation between a transverse engine and a gas-liquid separator.
Figure 5:
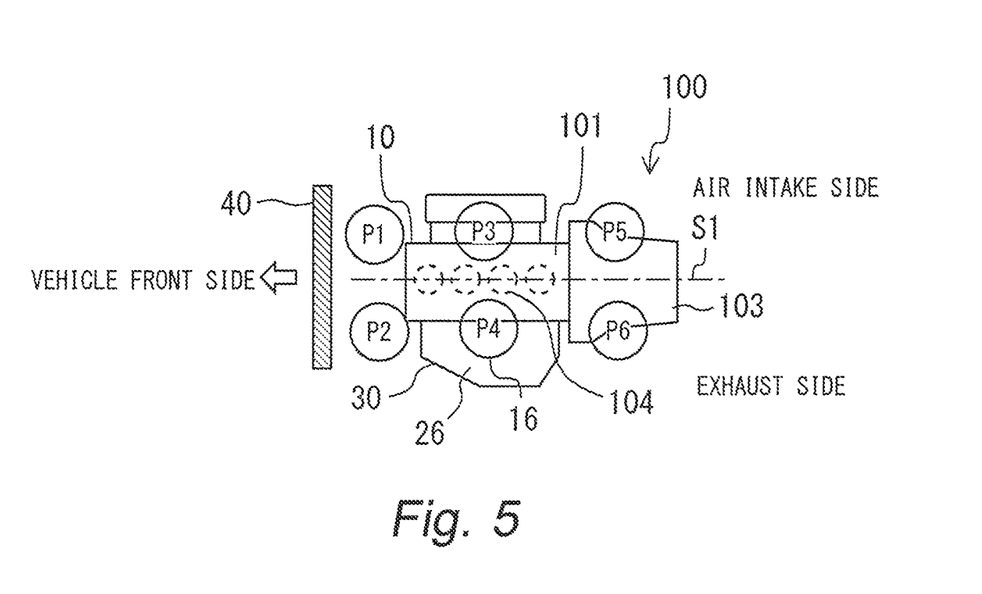
FIG. 5 is a diagram for explaining a best positional relation between a longitudinal engine and a gas-liquid separator.

FIGS. 3 to 5 illustrate specific arrangements of the gas-liquid separator 16 with respect to the engine 10 according to the engine type. Each of the drawings shows six positions in arrangements P1 to P6 as exemplary arrangements of the gas-liquid separator 16. More specifically, the arrangements P1 and P2 show positions opposite to the transmission 103 with respect to the engine 10. The arrangement P1 shows a position on the air intake side, and the arrangement P2 shows a position on the exhaust side, respectively. The arrangements P3 and P4 show positions above the engine 10. The arrangement P3 indicates a position on the air intake side, and the arrangement P4 indicates a position on the exhaust side, respectively. Further, the arrangements P5 and P6 indicate positions above the transmission 103. The arrangement P5 shows a position on the air intake side, and the arrangement P6 shows a position on the exhaust side, respectively.

FIGS. 3 and 4 are diagrams for explaining a good positional relation between a gas-liquid separator and a transverse engine. A transverse engine in this context means an engine arranged such that the row direction of the cylinders 104 is in a vertical direction with respect to the traveling direction of the vehicle. Further, FIG. 3 illustrates an exemplary arrangement in which the front side of the vehicle is the exhaust side, and FIG. 4 illustrates an exemplary arrangement in which the rear side of the vehicle is the exhaust side.

In the case where the engine 10 is a transverse engine, as shown in FIGS. 3 and 4, it is preferable to arrange the gas-liquid separator 16 at the position of the arrangement P2, P4, or P6 where it is on the exhaust side with respect to the plane S1 of the engine 10. It is particularly preferable to arrange the gas-liquid separator 16 at the position of the arrangement P4 where the gas-liquid separator 16 positively receives the heat of the exhaust manifold 26 and the superheater 30.

FIG. 5 is a diagram for explaining a best positional relation between a gas-liquid separator and a longitudinal engine. A longitudinal engine in this context means an engine arranged such that the row direction of the cylinders 104 is in parallel with the travelling direction of the vehicle. Even in the case where the engine 10 is a longitudinal engine, it is preferable to arrange the gas-liquid separator 16 at the position of the arrangement P2, P4, or P6 which is on the exhaust side with respect to the plane S1 of the engine 10, similar to the case where the engine 10 is a transverse engine. It is more preferable to arrange the gas-liquid separator 16 at the position of the arrangement P4 where it positively receives heat of the exhaust manifold 26 and the superheater 30.

2-2-2. Positional Relation Between Gas-Liquid Separator and Condenser

Figure 6A:
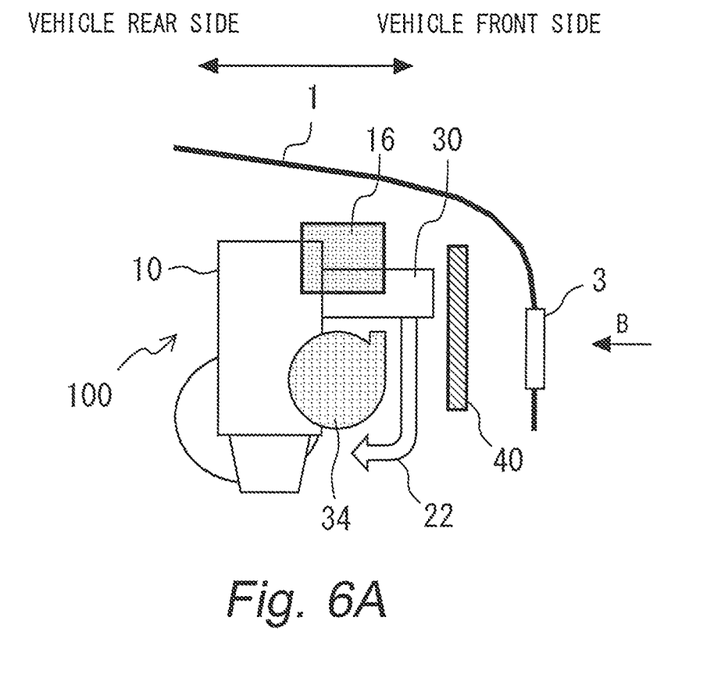
FIGS. 6A and 6B are diagrams for explaining a positional relation between a condenser and a gas-liquid separator.
Figure 6B:
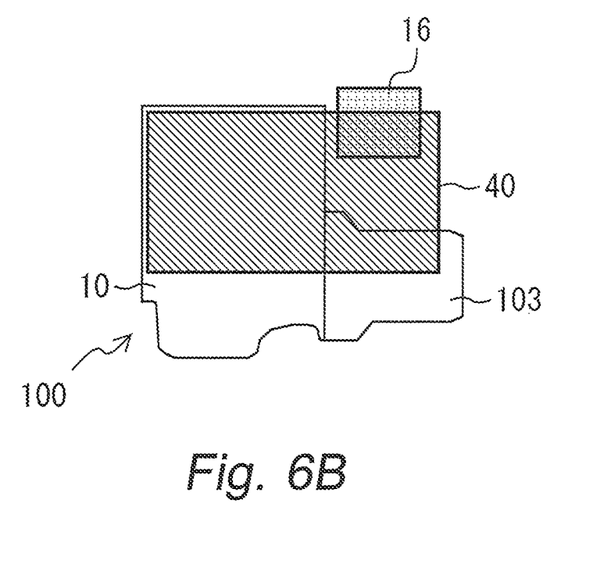

FIGS. 6A and 6B are diagrams for explaining a positional relation between a gas-liquid separator and a condenser, in which FIG. 6A is a schematic perspective view of the inside of the engine compartment 1 seen from a side face side of the vehicle, and FIG. 6B is a schematic perspective view of the inside of the engine compartment 1 seen from the front of the vehicle, that is, in a direction B shown in FIG. 6A.

As illustrated in FIG. 6A, the condenser 40 is arranged on the vehicle front side with respect to the gas-liquid separator 16. Further, a grille 3 for taking traveling air into the engine compartment 1 is arranged in front of the condenser 40. Further, as illustrated in FIG. 6B, the gas-liquid separator 16 is arranged at a position where a portion thereof overlaps the condenser 40 when seen from the front of the vehicle. According to the arrangement of the gas-liquid separator 16 as illustrated in FIGS. 6A and 6B, a portion of the traveling air from the grille 3 blowing through around the gas-liquid separator 16 is blocked by the condenser 40. Thereby, a temperature drop of the gas-liquid separator 16 due to the travelling air can be reduced.

While a lower portion of the gas-liquid separator 16 overlaps the condenser 40 when seen from the front of the vehicle in the example described above, the positioning relation between the gas-liquid separator 16 and the condenser 40 is not limited to this relation. It is only necessary that at least a portion of the gas-liquid separator 16 overlaps the condenser 40 when seen from the front of the vehicle. With this configuration, a temperature drop of the gas-liquid separator 16 caused by the travelling air can be reduced.

Second Embodiment

Figure 7A:
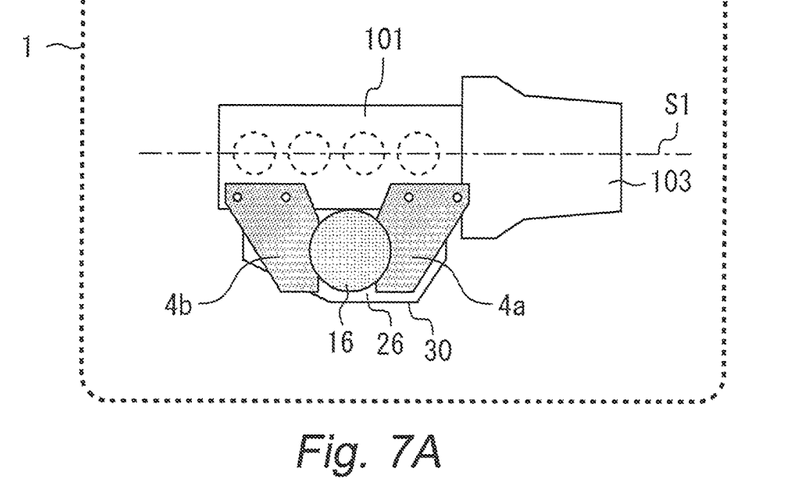
FIGS. 7A and 7B are schematic diagrams for explaining a structure of fixing a gas-liquid separator in a Rankine cycle system according to a second embodiment of the present invention.
Figure 7B:
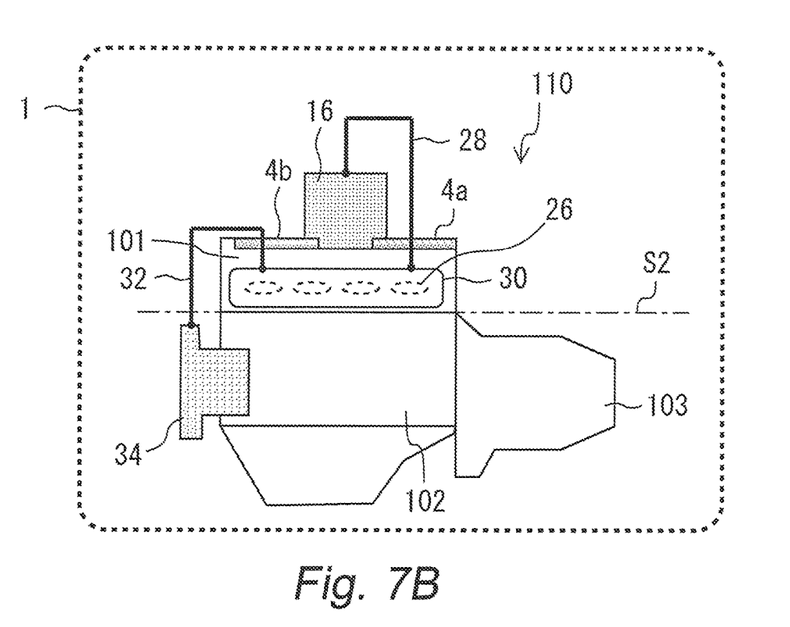

Next, a Rankine cycle system 110 of a second embodiment will be described. FIGS. 7A and 7B are schematic diagrams for explaining a structure of fixing the gas-liquid separator 16 in the Rankine cycle system 110 of the second embodiment, in which FIG. 7A illustrates the Rankine cycle system when seen from the top of the vehicle, and FIG. 7B illustrates the Rankine cycle system mounted on the vehicle when seen from the front of the vehicle, respectively. Further, in FIGS. 7A and 7B, the same elements as those of the Rankine cycle system 100 of the first embodiment illustrated in FIGS. 2A and 2B are denoted by the same reference numerals.

The Rankine cycle system 110 of the second embodiment is arranged at a position where the gas-liquid separator 16 overlaps the superheater 30 or the exhaust manifold 26 in a region above the exhaust side of the engine 10 when seen from the top of the vehicle. The gas-liquid separator 16 is fixed to the engine 10 via brackets 4a and 4b. The respective brackets 4a and 4b are fixed to an upper surface of the cylinder head 101, and are arranged to extend from the upper surface in the horizontal direction of the exhaust side. The gas-liquid separator 16 is interposed and fixed between the brackets 4a and 4b. Thereby, the upper surface of the superheater 30 is covered with the gas-liquid separator 16 and the brackets 4a and 4b. It should be noted that each of the brackets 4a and 4b is formed by processing a plate material made of metal, and is in a shape capable of securing strength necessary for fixing the gas-liquid separator 16. Further, a plurality of bolts is used for fixing between the brackets 4a and 4b and the engine 10 and between the brackets 4a and 4b and the gas-liquid separator 16, respectively.

With this configuration, the brackets 4a and 4b function as heat transfer members that efficiently receive the heat of the superheater 30 and transfer the heat to the gas-liquid separator 16. Thereby, as the gas-liquid separator 16 is able to efficiently receive the heat of the superheater 30, a temperature drop is suppressed.

It should be noted that in the Rankine cycle system 110 of the second embodiment, the shape of the brackets 4a and 4b is not limited. The brackets 4a and 4b may be in a shape covering at least the upper surface side of the superheater 30 or the exhaust manifold 26. Further, the material of the brackets 4a and 4b is not limited to metal. However, it is preferable to use a material having high heat conductivity and high strength.

Third Embodiment

Figure 8:
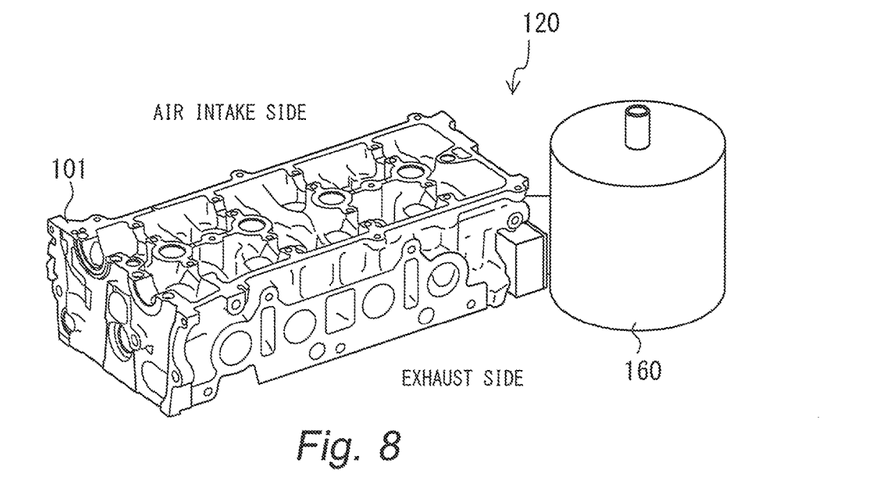
FIG. 8 is a schematic diagram for explaining a structure of fixing a gas-liquid separator in a Rankine cycle system according to a third embodiment of the present invention.
Figure 9:
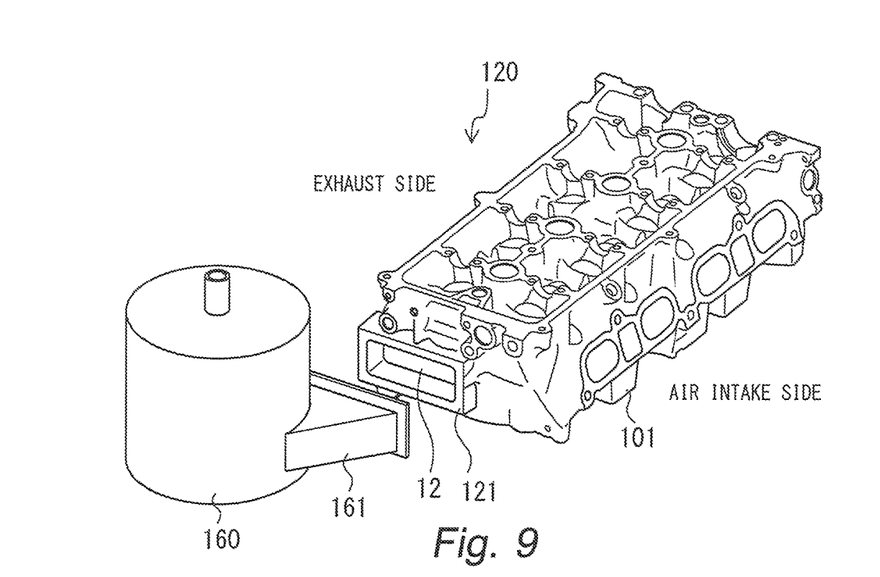
FIG. 9 is a schematic diagram for explaining a structure of fixing a gas-liquid separator f in the Rankine cycle system according to the third embodiment of the present invention.

Next, a Rankine cycle system 120 of a third embodiment will be described. The Rankine cycle system 120 of the third embodiment is characterized in a structure in which the cylinder head 101 and the gas-liquid separator 160 are integrally formed. FIGS. 8 and 9 are schematic diagrams for explaining a structure of fixing a gas-liquid separator in the Rankine cycle system 120 of the third embodiment. FIG. 8 illustrates a state where the gas-liquid separator 160 and the cylinder head 101 are integrated when seen from the exhaust side, and FIG. 9 illustrates a state where the gas-liquid separator 160 and the cylinder head 101 are disassembled when seen from the air intake side, respectively.

As illustrated in FIGS. 8 and 9, the gas-liquid separator 160 is provided with an inlet port 161 for refrigerant. The inlet port 161 is used for introducing refrigerant from the refrigerant flow path 12 of the engine 10 to the gas-liquid separator 160. The inlet port 161 of the gas-liquid separator 160 is joined to an outlet port 121 of the refrigerant flow path 12 of the cylinder head 101 by welding or the like, whereby the gas-liquid separator 16 and the cylinder head 101 are integrated.

With this configuration, as the gas-liquid separator 160 and the cylinder head 101 are integrally fixed, a temperature drop is suppressed by an action of heat transfer from the cylinder head 101. Further, as the gas-liquid separator 160 and the cylinder head 101 are integrated, heat transfer property can be improved and the number of components such as refrigerant pipes and brackets can be reduced.

Fourth Embodiment

Figure 10:
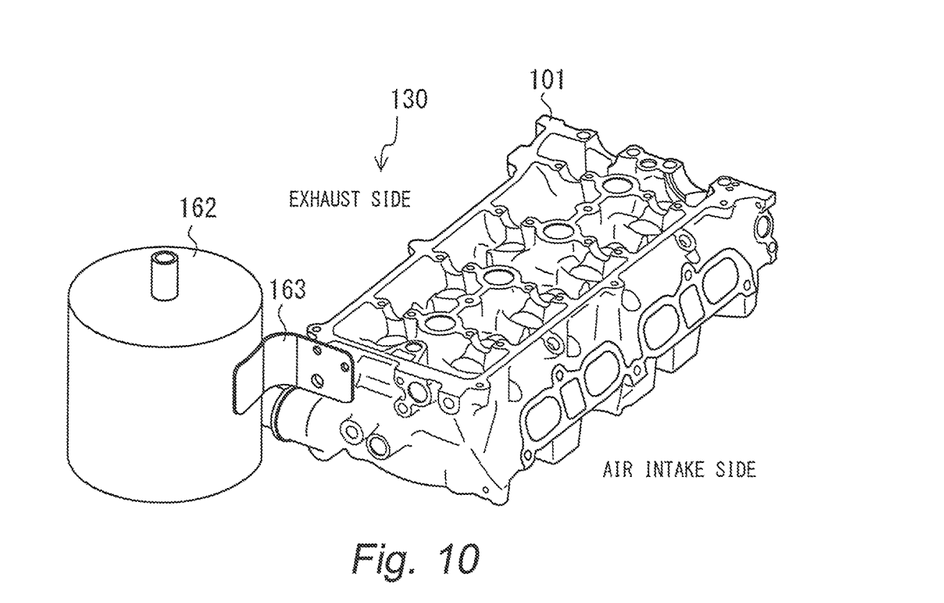
FIG. 10 is a schematic diagram for explaining a structure of fixing a gas-liquid separator in a Rankine cycle system according to a fourth embodiment of the present invention.
Figure 11:
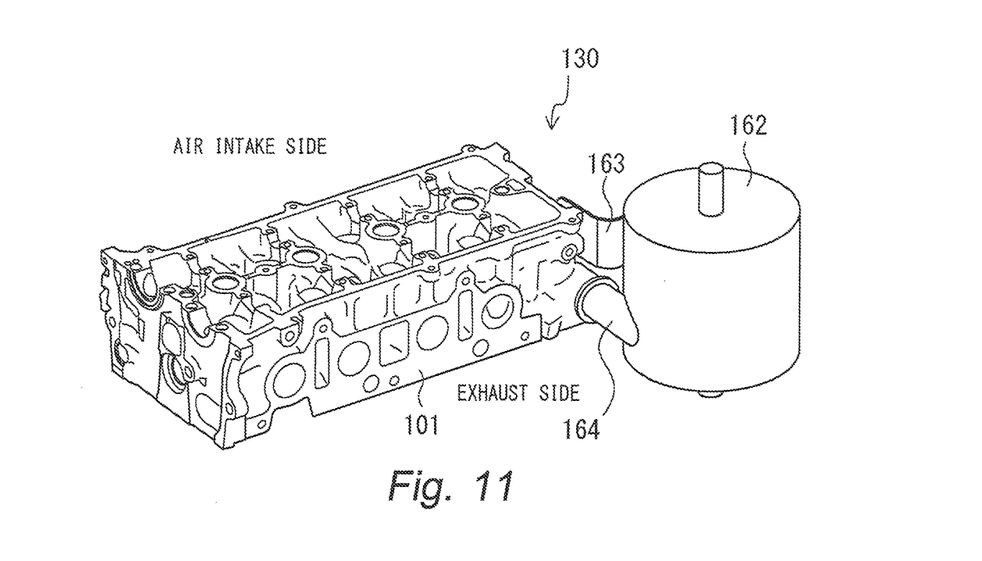
FIG. 11 is a schematic diagram for explaining a structure of fixing a gas-liquid separator in the Rankine cycle system according to the fourth embodiment of the present invention.

Next, a Rankine cycle system 130 of a fourth embodiment will be described. The Rankine cycle system 130 of the fourth embodiment is characterized in that a bracket 163 for mounting a gas-liquid separator 162 to the cylinder head is integrally formed with the gas-liquid separator 162. FIGS. 10 and 11 are schematic diagrams for explaining a structure of fixing the gas-liquid separator 162 in the Rankine cycle system 130 of the fourth embodiment. FIG. 10 is a perspective view of a state where the gas-liquid separator 162 is mounted on the cylinder head 101 when seen from the air intake side, and FIG. 11 is a perspective view of a state where the gas-liquid separator 162 is mounted on the cylinder head 101 when seen from the exhaust side, respectively.

As illustrated in FIGS. 10 and 11, the gas-liquid separator 162 is provided with the bracket 163 integrally. The bracket 163 is configured such that one end side thereof is directly joined to the main body of the gas-liquid separator 162 by welding or the like, and the other end side thereof is fixed to a side face of the cylinder head 101 with bolts or the like. The gas-liquid separator 162 is also provided with an inlet port 164 for refrigerant. The inlet port 164 is connected with an outlet port (not shown) of the refrigerant flow path 12 of the cylinder head 101.

With this configuration, as the gas-liquid separator 162 is fixed to the cylinder head 101, a temperature drop is suppressed by an action of heat transfer from the cylinder head 101. Further, as the bracket 163 is integrated with the gas-liquid separator 162, heat conductive property can be improved and the number of components can be reduced.

Fifth Embodiment

Figure 12:
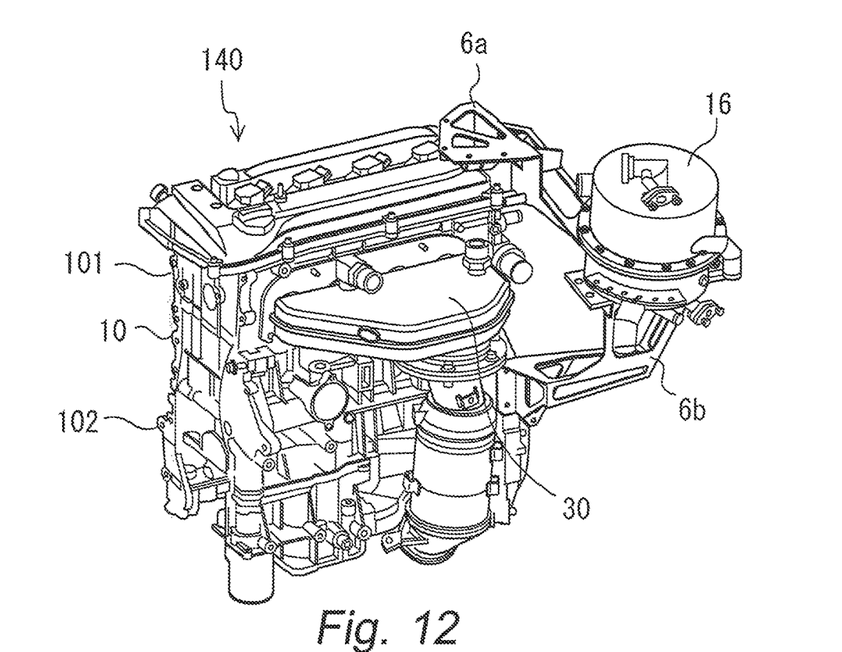
FIG. 12 is a schematic diagram for explaining a structure of fixing a gas-liquid separator in a Rankine cycle system according to a fifth embodiment of the present invention.
Figure 13:
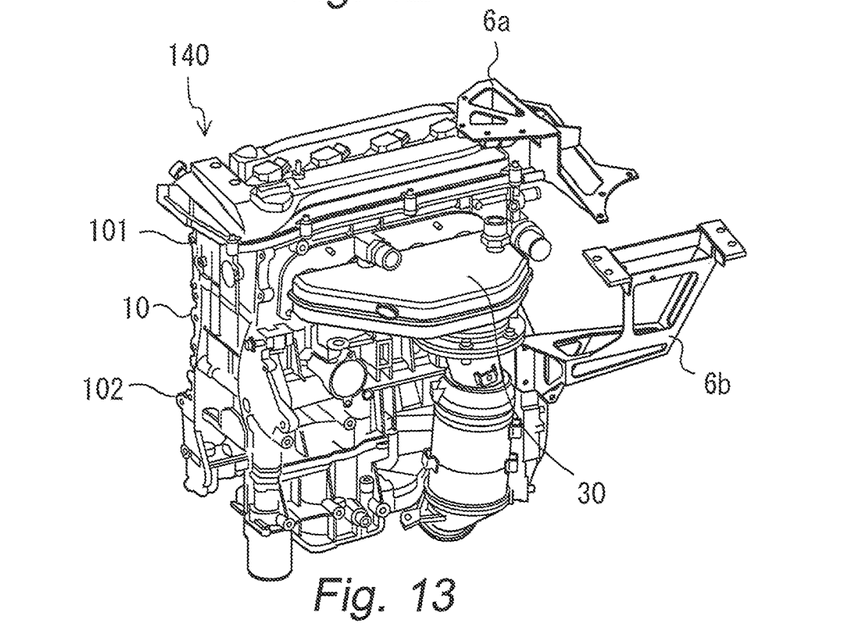
FIG. 13 is a schematic diagram for explaining a structure of fixing a gas-liquid separator in a Rankine cycle system according to the fifth embodiment of the present invention.

Next, a Rankine cycle system 140 of a fifth embodiment will be described. The Rankine cycle system 140 of the fifth embodiment is characterized in the arrangement of the gas-liquid separator 16 and the punched shape of brackets 6a and 6b. FIG. 12 and FIG. 13 are schematic diagrams for explaining a structure of fixing a gas-liquid separator 16 in the Rankine cycle system 140 of the fifth embodiment. FIG. 12 illustrates a perspective view of a state where the gas-liquid separator 16 is mounted on the engine 10 when seen from the exhaust side, and FIG. 13 is a diagram in which the gas-liquid separator 16 of FIG. 12 is not shown. In FIGS. 12 and 13, the same elements as those of the Rankine cycle system 100 of the first embodiment illustrated in FIGS. 2A and 2B are denoted by the same reference numerals.

As illustrated in FIGS. 12 and 13, the gas-liquid separator 16 is arranged at a position where it does not overlap the superheater 30 and the exhaust manifold 26 when seen from the top of the vehicle, that is, at a position away from the superheater 30 and the exhaust manifold 26 in a horizontal direction. The gas-liquid separator 16 is fixed with the brackets 6a and 6b. One end of the bracket 6a is fixed near an intermediate portion in the vertical direction of the gas-liquid separator 16, and the other end thereof is fixed to an upper surface of the cylinder head 101 of the engine 10. Further, one end of the bracket 6b is fixed to a lower portion of the gas-liquid separator 16, and the other end thereof is fixed to a side face of the cylinder block 102 of the engine 10.

Figure 14:
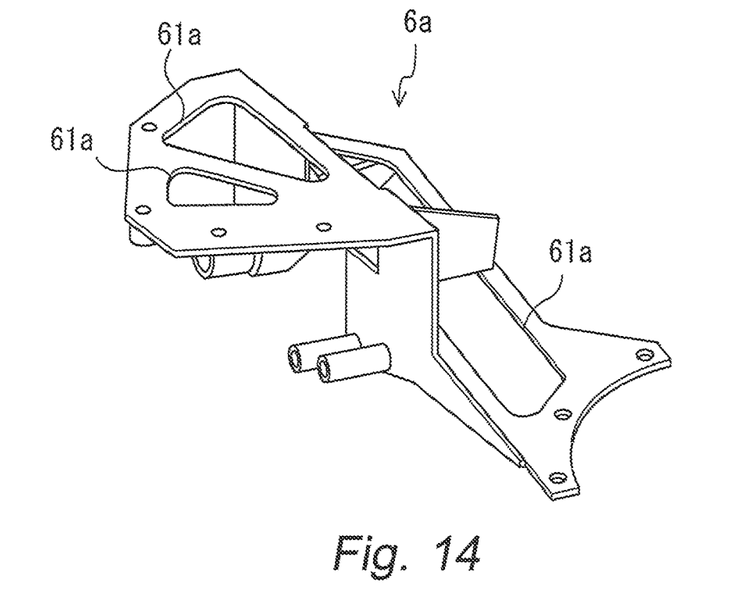
Figure 15:
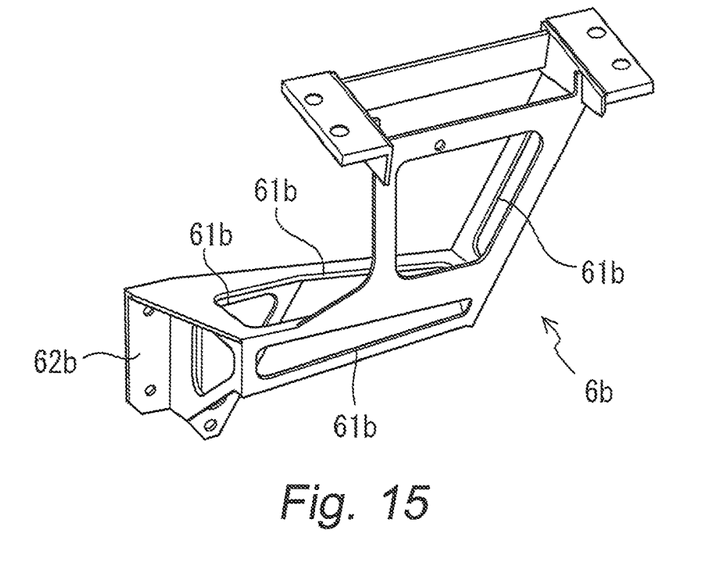
FIG. 15 is a diagram for explaining the shape of a bracket 6b.

FIG. 14 is a diagram for explaining the shape of the bracket 6a. FIG. 15 is a diagram for explaining the shape of the bracket 6b. As shown in FIG. 14, the bracket 6a has a plurality of punched portions 61a. Similarly, the bracket 6b has a plurality of punched portions 61b. The shapes and the numbers of the punched portions 61a and 61b are not limited if they are within a range capable of securing the strength for fixing the gas-liquid separator 16.

With this configuration, heat of the engine 10 is transferred to the gas-liquid separator 16 via the brackets 6a and 6b. However, as the gas-liquid separator 16 is arranged at a position separated from the superheater 30 and the exhaust manifold 26, there is a possibility that rejection of the heat from the brackets 6a and 6b to the surrounding, transferred from the engine 10, may be increased due to an effect of traveling air or the like. According to the aforementioned structure of the brackets 6a and 6b, the surface areas of the brackets 6a and 6b are reduced due to the punched portions 61a and 61b. As such, a temperature drop of the gas-liquid separator 16 due to heat rejection from the brackets 6a and 6b is suppressed effectively.

Sixth Embodiment

Figure 16A:
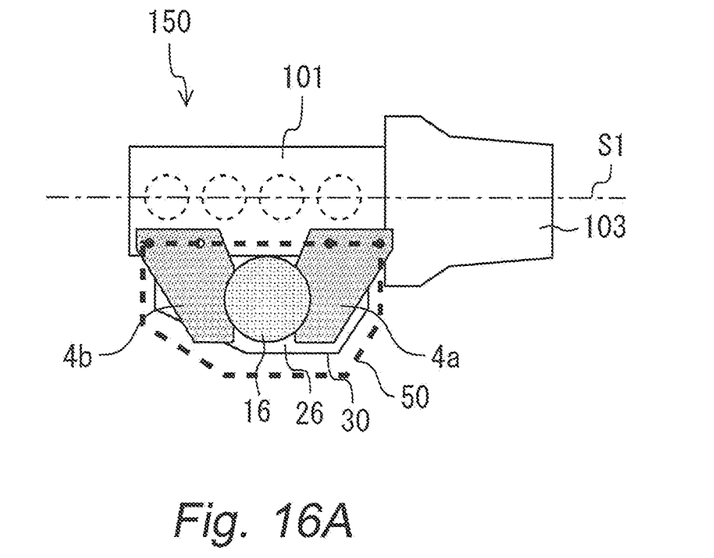
FIGS. 16A and 16B are diagrams illustrating a configuration of a Rankine cycle system according to a sixth embodiment of the present invention.
Figure 16B:
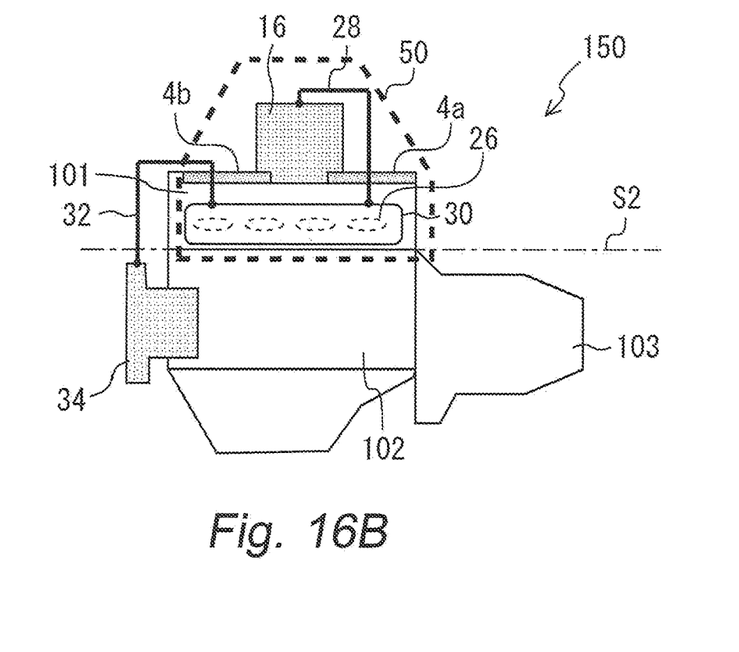

FIGS. 16A and 16B are diagrams illustrating a configuration of a Rankine cycle system 150 of a sixth embodiment, in which FIG. 16A illustrates the Rankine cycle system when seen from the top of a vehicle, and FIG. 16B illustrates the Rankine cycle system mounted on the vehicle when seen from the front of the vehicle, respectively. Further, in FIGS. 16A and 16B, the same elements as those of the Rankine cycle system 110 of the second embodiment illustrated in FIGS. 7A and 7B are denoted by the same reference numerals.

The Rankine cycle system 150 of the sixth embodiment is configured such that the gas-liquid separator 16 is arranged in a region above the exhaust side of the engine 10 at a position where it overlaps the superheater 30 or the exhaust manifold 26, when seen from the top of the vehicle, which is similar to the case of the Rankine cycle system 110 of the second embodiment illustrated in FIGS. 7A and 7B. A heat insulation tank 50 is provided to cover at least the gas-liquid separator 16 and the superheater 30. The heat insulation tank 50 is used for insulating the heat inside the tank by limiting heat transfer.

With this configuration, a temperature drop of the gas-liquid separator 16 arranged inside is suppressed by the heat insulation function of the heat insulation tank 50. Further, as the gas-liquid separator 16 is arranged immediately above the superheater 30, a distance between the gas-liquid separator 16 and the superheater 30 is shortened. As such, it is possible to cover them with the heat insulation tank 50 having a relatively small capacity, which enables the thermal capacity of the heat insulation tank 50 to be reduced. Thereby, the heat insulation effect is improved.

What is claimed is:

1. A Rankine cycle system for vehicle comprising:
a boiler configured to apply waste heat to refrigerant circulating in an internal-combustion engine to vaporize the refrigerant;
a gas-liquid separator configured to separate gas-liquid two-phase refrigerant, sent from the boiler, into gas phase fluid and liquid phase fluid;
a superheater configured to superheat the gas phase fluid, sent from the gas-liquid separator, through heat exchange with exhaust gas of the internal-combustion engine;
an expander configured to expand the gas phase fluid, passing through the superheater, to recover thermal energy; and
a condenser configured to condense the gas phase fluid, passing through the expander, to return the gas phase fluid to liquid phase fluid, wherein
the gas-liquid separator is fixed to a cylinder head of the internal-combustion engine,
wherein the condenser is arranged on a vehicle front side with respect to the gas-liquid separator, and
the gas-liquid separator is arranged at a position where a part of the gas-liquid separator overlaps the condenser when seen from a front of the vehicle.

2. The Rankine cycle system for vehicle according to claim 1, wherein
the gas-liquid separator includes a bracket made of metal, and
the gas-liquid separator is fixed to the cylinder head via the bracket.

3. The Rankine cycle system for vehicle according to claim 1, wherein
the internal-combustion engine includes a plurality of cylinders arranged in series, and
the gas-liquid separator is fixed on an exhaust side with respect to a plane including a central axis of the cylinders, the plane being in parallel with a row direction of the cylinders.

4. The Rankine cycle system for vehicle according to claim 1, further comprising
a heat insulation tank that integrally covers the superheater and the gas-liquid separator.

* * * * *